United States Patent

[11] 3,624,132

[72] Inventor Wilbert H. Urry
 Chicago, Ill.
[21] Appl. No. 612,340
[22] Filed Jan. 30, 1967
[45] Patented Nov. 30, 1971
[73] Assignee Commercial Solvents Corporation
 New York, N.Y.

[54] ETHYL 2-(5-FORMYLPENTYL)-4,6-DIMETHOXYBENZOATE
 1 Claim, No Drawings

[52] U.S. Cl. .................................................. 260/473 R,
 260/410.9 R, 260/413, 260/468 R, 260/521 R,
 260/602, 260/614 R
[51] Int. Cl. .................................................. C07c 69/74,
 C07c 69/92

[50] Field of Search .......................................... 260/413,
 473, 602

[56] References Cited
 OTHER REFERENCES
 Chem. Abstr. 56: 14159i (1962)
 Chem. Abstr. 56: 7261i (1962)

*Primary Examiner*—Lewis Gotts
*Assistant Examiner*—R. S. Weissberg
*Attorneys*—Eugene L. Bernard, W. Brown Morton, Jr., Malcolm L. Sutherland, John W. Behringer, James N. Dresser and Morton, Bernard, Brown, Roberts & Sutherland ABSTRACT: This application relates to 2-(5 carboxypentyl)-4, 6-dimethoxybenzoic acid, to intermediates useful in its preparation, and to methods for its preparation.

ETHYL 2-(5-FORMYLPENTYL)-4,6-DIMETHOXYBENZOATE

This invention relates to new chemical compounds and to their preparation. More particularly this invention relates to intermediates useful in the preparation of, 2-(5-carboxypentyl)-4,6-dimethoxybenzoic acid, and to methods for their preparation.

One of the products of this invention, 2-(5-carboxypentyl)-4,6-dimethoxybenzoic acid, is useful in a variety of different chemical applications. It may be used, for example, to provide new plasticizers, gelatinizing agents, swelling agents and softeners for synthetic resins and high polymer compounds as described in U.S. Pat. No. 2,862,956 to Gundel et al. Other compounds can be prepared from it which are useful as additives for lubricants and as fixatives for perfumes.

Methoxybenzene dicarboxylic acids have been found by Burkhard, U.S. Pat. No. 2,894,934, to be particularly useful in the preparation of synthetic polyester resins since they are compatible with and soluble in polyhydric alcohols and permit the esterification reaction between those two compounds and dihydric alcohols to take place rapidly and without the necessity of solvents. The polyester resins so produced exhibit improved hydrolytic stability and have uses as insulation for conductors used in magnet wires.

The unsaturated esters of methoxybenzene dicarboxylic acids, e.g. the mono- or divinyl or mono- or diallyl esters, which may be produced by the addition of acetylene or allyl alcohol in conventional process steps, can be readily polymerized with conventional olefin polymerization catalysts. The high polymer products have been found by Burnett, U.S. Pat. No. 2,821,520 to have substantially improved properties.

The 2-(5 carboxypentyl)-4,6-dimethoxybenzoic acid of the application is also useful in the production of polyamide type resins by condensation with a diamine compound using the techniques of Burkhard, U.S. Pat. No. 2,902,475. Polyamide resins have gained acceptance as fiber forming materials and the polymer products of alkoxybenzene dicarboxylic acids have higher melting points and hydrolytic stability.

The preparation of the compounds of this invention is described specifically in the following examples:

EXAMPLE I

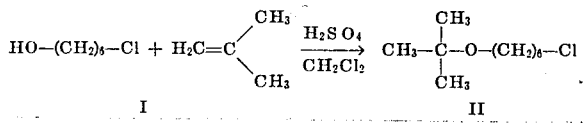

A solution of 6-chloro-1-hexanol I (50 g., Aldrich) and concentrated sulfuric acid (3 ml.) in methylene chloride (500 ml.) is treated with 2-methylpropene that is passed into it slowly at 25° C. with stirring for 20 hours. The reaction mixture is washed twice with sodium bicarbonate solution (5 percent, 2×200 ml.), and then with water. It is dried over anhydrous magnesium sulfate. Distillation gives 6-t-butoxy 1-chlorohexane II (30 g., 45 percent, b.p. 63°–64° C. at 0.3 mm.)

EXAMPLE II

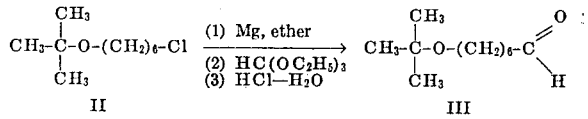

6-t-butoxy-1-chlorohexane II (29 g., 0.17 mole) is brought into reaction with magnesium turnings (4.5 g., 0.19 g.atom) in anhydrous ether (reflux, 12 hours). Then, ethyl orthoformate (44.4 g., 0.30 mole) in ethyl ether (100 ml.) is added to it dropwise. This reaction mixture is heated under reflux for an additional 12 hours. After the reaction mixture has cooled, dilute hydrochloric acid (2N) is added to it. The ether layer is separated, is washed with water, and is dried (MgSO$_4$). When the ether has been removed, nuclear magnetic resonance spectrum of the residual product indicates that it contains the diethyl acetal. Hence, this oil is stirred at 25° C. with dilute hydrochloric acid (3N, 100 ml.) for 2 hours. The organic phase is then taken up in ether, and the ether solution is extracted with water (3×25 ml.) and is dried (MgSO$_4$). Distillation gives 7-t-butoxyheptanal II (13 g., 45 percent, b.p. 66°–67° C. at 0.3 mm.).

EXAMPLE III

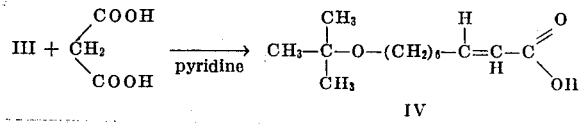

A solution of 7-t-butoxyheptanal III (11.0 g., 0.059 mole) and malonic acid (6.0 g., 0.058 mole) in pyridine (35 ml.) is held at 70° C. for 24 hours. More malonic acid (4.0 g.) is then added, and the reaction mixture is held at 70° C. for another 12 hours. After the reaction mixture has been cooled in an ice bath, it is treated with sulfuric acid (50 percent). The oily layer that separates is extracted with ether. The ether extract is washed with water and dried (MgSO$_4$). Evaporation of the ether solution gives crude 9-t-butoxy-trans-2-nonenoic acid IV (9.8 g., 0.043 mole, 73 percent. $^1$H NMR in CCl$_4$ with TMS: 9H singlet at 1.22δ; 8H singlet at 1.45δ; 2H multiplet at 2.38δ; J 7 c.p.s. apparent; 2H triplet at 3.52δ, J 6 c.p.s., 1H doublet at 6.15δ, J 17 c.p.s., 1H pair of triplets at 7.48δ, with J 17 c.p.s. between them and J 7 c.p.s. within them; and 1H singlet at 11.51δ).

EXAMPLE IV

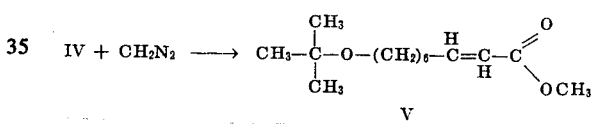

This acid IV (9.8 g., 0.043 mole) in ether is treated with an ether solution of diazomethane until its color persists. Evaporation of the ether gives crude methyl 9-t-butoxy-trans-2-nonenoate V (10.0 g.).

In a similar preparative sequence, this ester V is prepared in larger amount (55.0 g.). It distillation through the Nester-Faust spinning band fractionating column gives the pure methyl 9-t-butoxy-trans-2-nonenoate V (b.p. 87.5° C. at 0.33 mm., 37.0 g. $^1$H NMR in CCl$_4$ with TMS: 9H singlet at 1.09δ; 8H singlet at 1.33δ; 2H multiplet at 2.12δ, J 6 c.p.s.; 2H triplet at 3.14δ, J 6 c.p.s.; 3H singlet at 3.52δ; 1H doublet at 5.55δ, J 15.5 c.p.s. with each peak a triplet, J 1 c.p.s.; and 1H pair of triplets at 6.64δ, J 15.5 c.p.s. between them and J 6 c.p.s. within them).

Anal. Calcd. for C$_{14}$H$_{26}$O$_3$: C, 69.4; H, 10.8. Found: C, 71.3; H, 11.0.

EXAMPLE V

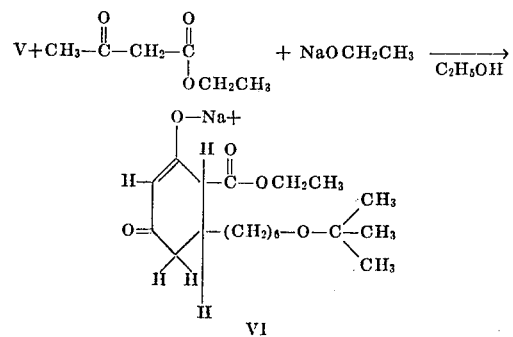

This ester V (36.0 g., 0.149 mole) is added to a refluxing reaction mixture prepared from ethyl acetoacetate (22.9 g., 0.176 mole), sodium (4.0 g., 0.174 gram atom) and anhydrous ethanol (50 ml.). After the addition is complete, the reaction mixture is heated at reflux for an additional 24 hours. The produce VI that has precipitates is removed on a filter, washed with ether, and dried in a desiccator (46.0 g., 0.127 mole, 85 percent. $^1$H NMR in D$_2$O with DDS: taken immediately after preparation 9H singlet at 1.15δ; 14H broad singlet at 1.33δ; 2H multiplet 2.05 to 2.70δ with peak at 2.20δ; 1H doublet at 3.12δ, J 10 c.p.s. c.p.s.; H triplet at 3.30δ, J 6 c.p.s.; 2H quartet at 4.19δ, J 7 c.p.s.; 2H DOH singlet at 4.54δ).

EXAMPLE VI

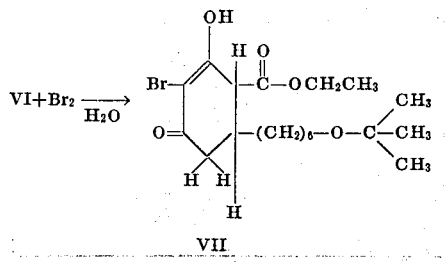

This sodium salt VI (8.4 g., 0.023 mole) in solution in water (100 ml.) is treated with bromine (4.0 g., 0.025 mole) dropwise with stirring. The viscous liquid that precipitates is recovered by extraction with ether. The product (8.0 g., 0.019 mole, 83 percent) does not crystallize, but its NMR spectrum is that of ethyl 3-bromo-6-(6-t-butoxyhexyl)-dihydroresorcylate VII ($^1$H NMR in CCl$_4$ with TMS: singlet at 1.15δ; large singlet at 3.32δ; multiplet 2.1–2.8δ; triplet at 3.28δ, j 6 c.p.s.; quartet at 4.18δ, J 7 c.p.s.; and singlet at 6.90δ).

EXAMPLE VII

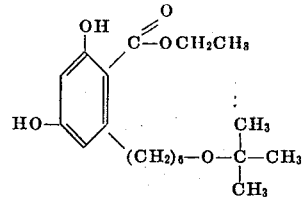

This bromide VII (8.0 g., 0.019 mole) is treated with a sodium ethoxide solution (from sodium, 4.0 g., 0.174 gram atom, in ethanol, 100 ml.) at reflux for 3 hours. Then the ethanol is evaporated, the residue is dissolved in water, and the aqueous solution is acidified. The mixture is extracted with ether, and the ether solution is washed with water and dried. Evaporation of the ether gives crude ethyl 6(6-t-butoxyhexyl)-resorcylate VIII (5.75 g., 0.017 mole, 90 percent. $^1$H NMR in DCCl$_3$ with TMS: 9H singlet at 1.19δ; 11H multiplet with peak at 1.38δ— part of triplet, J 7 c.p.s.; 2H multiplet 2.0–3.0; 2H triplet at 3.38δ, J 6 c.p.s.; 2H quartet at 4.38δ, J 7 c.p.s.; 2H singlet at 6.30δ; and broad 2H singlet at 7.13δ).

EXAMPLE VIII

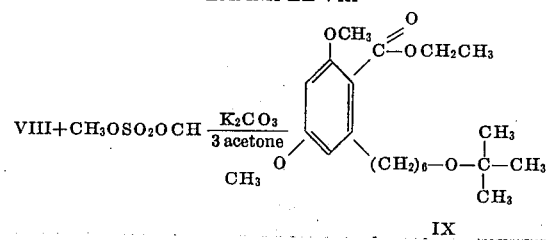

A solution of this ester VIII (10.14 g., 0.030 mole) and anhydrous potassium carbonate (14.0 g.) in acetone (350 ml.) is held at reflux while methyl sulfate (40 ml., 53.2 g., 0.422 mole) is added (4 ml. at 2 hour intervals over 20 hours.) After addition is complete, the reaction mixture is held at reflux for an additional 4 hours. Then it is diluted with an equal volume of water, acetone is evaporated (Rinco), and the oily layer is taken up in ether. The ether solution is washed twice with water, and then it is dried (MgSO$_4$). After the ether has been removed by evaporation, the product IX, ethyl 2-(6-tertiary butoxyhexyl)-4, 6-dimethoxybenzoate, (9.0 g., 0.0246 mole, 82 percent) again fails to crystallize.

EXAMPLE IX

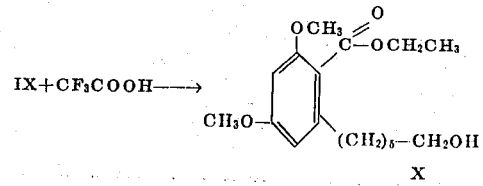

The product IX is immediately dissolved in trifluoroacetic acid (100 ml.), and the solution is allowed to stand for 1 hour at 25° C. Most of the trifluoroacetic acid is removed by evaporation, and the residual reaction mixture is neutralized with potassium carbonate solution. The oil product is extracted with ether, and the ether solution is washed with water and dried (MgSO$_4$). The product obtained by evaporation of the ether is a trifluoroacetate ester (triplet methylene and quartet methylene NMR absorptions were superimposed at about 4.30δ). Hence, the product is heated with sodium hydroxide solution (50 percent) with vigorous stirring for 15 min. The usual workup gives an oil that is predominantly ethyl 2-(6-hydrohexyl)-4,6-dimethoxybenzoate X ($^1$H NMR in CDCl$_3$ with TMS: 11H multiplet with triplet apparent at 1.33δ, J 7 c.p.s., and methylene peak at 1.40δ; 2H triplet at 2.55δ, J 7 c.p.s.; 1H singlet at 2.92δ, disappears with D$_2$O treatment; 2H triplet at 3.55δ, J 6 c.p.s.; 6H singlet at 3.75δ, 2H quartet at 4.34δ, J 7 c.p.s.; and 2H singlet at 6.34δ).

EXAMPLE X

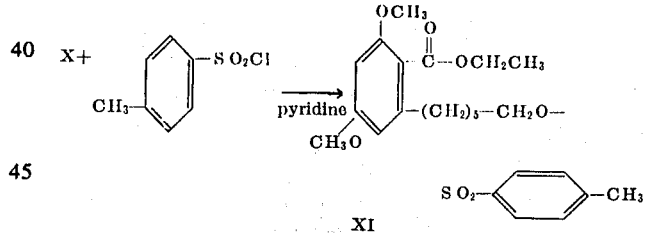

This alcohol X (2.5 g.) in pyridine (25 ml.) is treated with p-toluenesulfonyl chloride (2.3 g.), and the reaction mixture is stirred at 25° C. for 3 hours. An excess of water is added to it, and the semisolid product is extracted with ether. The combined ether extract is washed with water and dried (MgSO$_4$). After the ether and pyridine are evaporated (Rinco), the residual product is predominantly the tosyl derivative of ethyl 2-(6-hydroxyhexyl)-4,6-dimethoxybenzoate XI. ($^1$H NMR in CDCl$_3$ with TMS: multiplet with triplet at 1.33δ rising from it, J 7 c.p.s., singlet at 2.38δ; multiplet at 2.52δ; singlet at 3.75δ; triplet at 4.01δ, J 6 c.p.s.; quartet at 4.35δ, J 7 c.p.s.; singlet at 6.33δ; and doublets at 7.31 and 7.78δ, J 8.5 c.p.s.).

EXAMPLE XI

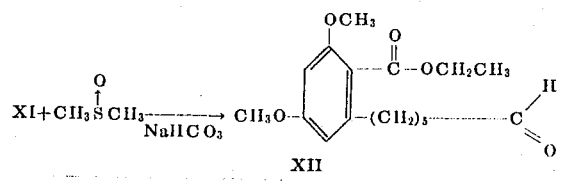

The product XI is contaminated with unreacted alcohol (triplet at 3.48δ) and pyridine (characteristic absorption 7–8δ ). The crude tosylate is added to a hot solution of sodium bicarbonate (6.0 g.) in dimethylsulfoxide (30 ml.). After the reaction mixture has been heated for 5 min., with vigorous stirring, excess water is added to it. The reaction mixture is then extracted with ligroin (60°–68°), and the ligroin solution is washed with water and dried (MgSO₄). Distillation of the ligroin gives residual crude ethyl 2-(5-formylpentyl)-4,6-dimethoxybenzoate XII (¹H NMR in CDCl₃ with TMS: 9H multiplet at 1–2δ with triplet at 1.33δ, J 7 c.p.s., rising from it, 4H multiplet 2.15–2.80δ; 6H singlet at 3.75δ; 2H quartet at 4.33δ, J 7 c.p.s.; 2H singlet at 6.34δ; and 1H triplet at 9.72δ) contaminated with unreacted alcohol (triplet at 3.48δ) and dimethylsulfoxide (singlet at 2.50δ).

EXAMPLE XII

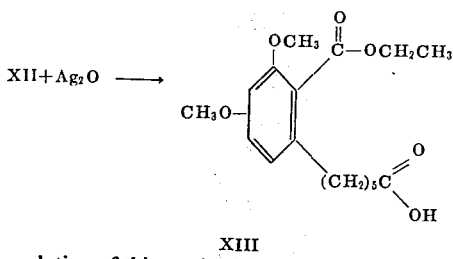

XIII

To a solution of this crude aldehyde XII (1.0 g.) in ethanol (200 ml.), silver nitrate (1.85 g.) in water (7 ml.) and then sodium hydroxide solution (0.5 N, 44 ml.) are added in succession with stirring. After the reaction mixture has been allowed to stir overnight it is filtered. The filtrate is evaporated to a small volume, and the residual solution is extracted with ether. The aqueous phase is acidified with dilute hydrochloric acid, and the acidic solution is extracted with ether. The ether solution is dried (MgSO₄), and then the ether is removed by evaporation leaving the crude ethyl 2-(5-carboxypentyl)-4,6-dimethoxybenzoate XIII (¹H NMR in CDCl₃ with TMS: 11H multiplet 1–2δ with triplet at 1.33δ, J 7 c.p.s., rising from it; 4H multiplet 2.0–1.8δ, apparently two overlapping triplets at 2.32δ, J 6 c.p.s., and 2.57δ, J 6.5c.p.s., 6H singlet at 3.77 δ; 2H quartet at 4.35δ, J 7 c.p.s.; 2H singlet at 6.34δ; and 1H singlet at 8.78δ).

EXAMPLE XIII

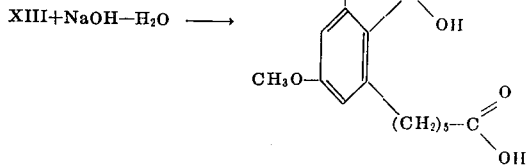

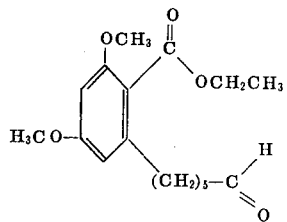

XIV

The crude product XIII is dissolved in sodium hydroxide solution (10percent, 10 ml.). and this reaction mixture is held under reflux for 14 hours. Then the reaction mixture is cooled to 25° C. and acidified with dilute hydrochloric acid. The mixture is extracted twice with chloroform, and the chloroform solution is washed with water and dried (Na₂SO₄). When the chloroform has been evaporated, the residual product solidifies. It is shown to be 2-(5-carboxypentyl)-4,6-dimethoxybenzoic acid XIV (m.p. 112°–113° C. from benzenecyclohexane. ¹H NMR in CDCl₃ with TMS: 6H broad multiplet with peat at 1.50δ; 2H triplet at 2.33δ, J 6.5 c.p.s.; 2H triplet at 2.75δ, J 7.5 c.p.s.; 6H singlet at 3.80δ; 2H singlet at 6.37δ; and 2H singlet at 9.42δ).

I claim:

1. The compound ethyl 2-(5-formylpentyl)-4,6-dimethoxybenzoate of the formula: